July 5, 1966  S. M. FREY  3,259,434
SEAT BELT LOCATER
Filed Sept. 4, 1964
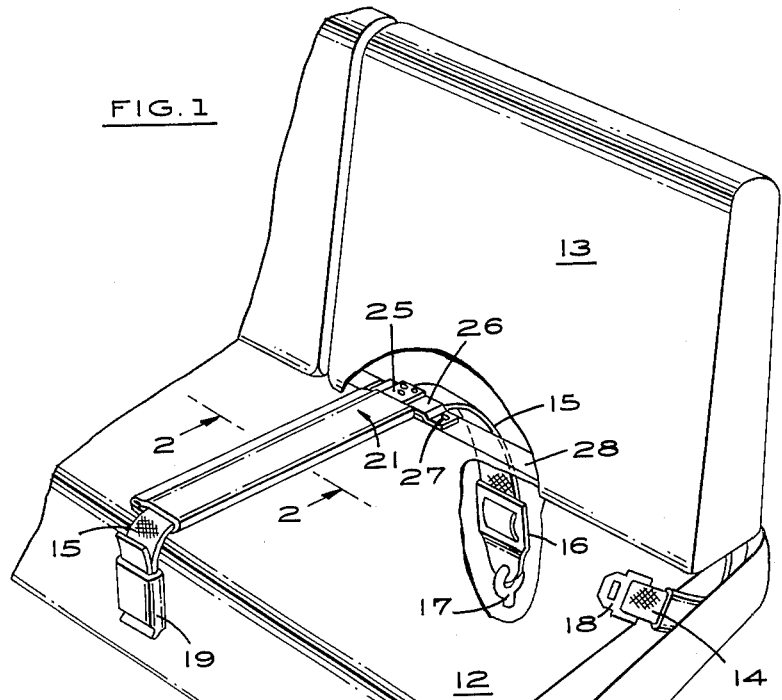
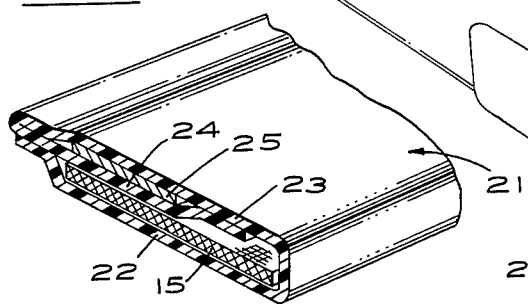
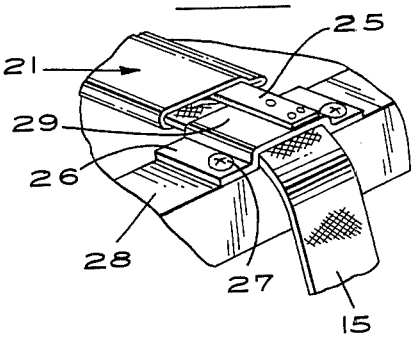
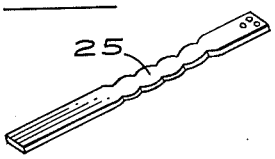
STUART M. FREY
INVENTOR
BY John R. Faulkner
John J. Roethel
ATTORNEYS 3,259,434
SEAT BELT LOCATER
Stuart M. Frey, Birmingham, Mich., assignor to Ford Motor Company, Dearborn, Mich., a corporation of Delaware
Filed Sept. 4, 1964, Ser. No. 394,492
4 Claims. (Cl. 297—385)

This invention relates to a seat belt positioning device adapted to hold a section of the seat belt in a readily accessible position when not in use.

The use of seat belts in automotive vehicles has steadily increased over the past few years. The safety aspects of seat belts are fully recognized by the majority of purchasers of automobiles, but they have been reluctant to fully accept the seat belts as an accessory because of the inconvenience caused by the loose ends of the belts when not in use. The belt sections have a tendency to become tangled; the outboard belt section has a tendency to be dragged out of the vehicle as the passenger is leaving the seat so that it must be flipped back onto the seat before the door can be closed; and when used on split-back front seats, the belt sections have a tendency to work their way down between the seat cushion and the seat back as the latter is tilted in a fore and aft direction as the vehicle passengers attempt to enter the rear seating section of the vehicle passenger compartment.

Accordingly, it is an object of the present invention to provide a seat belt positioning device which is simple, inexpensive and effective to locate the seat belt on the vehicle seat for ready accessibility, and yet which will not interfere with the proper functioning of the seat belt when used to restrain an occupant of the vehicle seat.

The seat belt positioning device embodying the present invention is intended for use with a seat belt assembly consisting of a short outboard belt component attached to the seat frame track or floor of the vehicle and a longer inboard belt component attached to the vehicle floor pan. The seat belt locator or positioning device comprises a flexible sleeve enclosing a resilient element which is attached to the seat cushion rear cross member. The longer inboard component of the seat belt assembly is contained by the sleeve of the positioning device. The sleeve permits adjustment of the seat without interfering with the belt attachment to the floor or hampering the positioning characteristic.

Upon release of the seat belt buckle, the positioning device through the action of the resilient element in the sleeve moves the inboard belt from the "in use" position to a "park" position on the seat cushion. This eliminates untangling and searching for the inboard belt component upon re-entry of the passenger to the vehicle and maintains the belt away from the area of the seat to be occupied by the passenger. Since the outboard belt component is short, it is inherently free from tangling and is not long enough to fall between the seat and door or hang out of the vehicle. Therefore, it is not necessary to make special provision for locating the outboard component.

Other objects, advantages and features of this invention will become more apparent as this description proceeds, reference being had to the accompanying drawing, in which:

FIG. 1 is a perspective view of the seat belt positioning device attached to an unoccupied vehicle seat;

FIG. 2 is a sectional view taken substantially on the line 2—2 of FIG. 1;

FIG. 3 is a perspective view illustrating the details of the method of attachment of the seat belt positioning device to the rear rail of the vehicle seat frame; and FIG. 4 is a perspective view of one of the components of the seat belt positioning device.

Referring now to the drawing, there is illustrated a portion of a conventional vehicle seat, generally designated 11, having a seat cushion 12 and a back rest 13. Also illustrated is a seat belt assembly consisting of a short outboard belt 14 and a longer inboard belt 15. Each belt is adapted to be anchored to the vehicle body in a conventional manner, the short outboard belt 14 being adapted to be attached to the seat frame, the seat adjuster track, or to the vehicle body floor pan and the longer inboard belt 15 being adapted to be anchored in a similar manner. As shown, the longer inboard belt 15 is looped through the eye of a clasp member 16 coupled to an eye bolt 17 which is anchored to the vehicle floor. The free end of the belt 14 carries a tongue element 18 adapted to snap into a tongue receiving buckle device 19.

The use of the short outboard belt 14 eliminates many difficulties usually encountered with a long outboard belt. The belt 14 is short enough so that it will not readily become tangled, it will not encroach on the seating area and thereby become wedged beneath the seat occupant, and it will not fall out of the vehicle door opening upon egress of the seat occupant from the vehicle.

The increased length of the inboard seat belt 15 necessitated by the use of the shorter outboard belt presents several problems. Because of its length, the belt 15 is readily susceptible to being twisted and tangled; it readily encroaches on the area of the seat to be occupied by the seat occupant thereby necessitating much tugging and pulling to free the belt for use; and, in the case of a split-back seat, it is susceptible to movement through the gap between the seat back and the seat cushion each time the seat back is tilted fore and aft to permit entry or exit of passengers to the rear seating area of the vehicle compartment.

The difficulties with the longer inboard belt 15 are eliminated by the present invention which comprises a flexible sleeve 21. The sleeve 21 is substantially rectangular in cross section, and it may be molded of a suitable plastic material having the desired flexibility characteristics. As best seen in FIG. 2, it comprises lower and upper substantial parallel wall sections 22 and 23. Between the lower and upper walls 22 and 23, there is a substantially parallel divider 24. The construction and arrangement is such that the inboard seat belt section 15 lies within the sleeve 21 between the lower wall 22 and the divider 24. The space between the divider 24 and the upper wall 23 provides an elongated recess or pocket which is adapted to receive a resilient member 25. This resilient member is illustrated as being a flat spring steel element, but it will be readily understood that it may be formed of spring steel wire or the like.

In the present embodiment, the resilient member 25 is riveted to the upper surface of a bracket 26 bolted at 27 to the seat cushion rear cross member 28. The bracket 26 is formed with a raised center portion 29 which permits the passage of the inboard seat belt section 15 between the bracket and the seat cushion rear cross member.

The sleeve 21 may be moved longitudinally of the resilient member 25 to position it as desired on the belt, but because the resilient member 25 is entrapped between the spacer layer 24 and the upper wall 23 of the sleeve, there can be no lateral displacement of the one relative to the other.

In operation, the inboard belt section 15, the flexible sleeve 21 and the resilient member 25 may be twisted to follow the contour of the midsection of the seat occupant so that the buckle elements may be attached one to the other. Upon disengagement of the buckle elements to release the seat belt, the flexible sleeve 21 and its contained resilient member element 25 become operative to move the inboard belt section 15 from the "in use" position to a "park" position on the seat cushion, the position shown in FIG. 1.

It will be understood that the invention is not to be limited to the exact construction shown and described, but that various changes and modifications may be made without departing from the spirit and scope of the invention, as defined in the appended claims.

I claim:
1. A seat belt positioning device for a seat belt having an elongated section extensible across a seat,
    said positioning device comprising a flexible sleeve member longitudinally encompassing a substantial portion of a seat belt section, said sleeve member and seat belt section flexing in unison when the latter is placed in seat occupant restraining position,
    a resilient member extending longitudinally of said sleeve member,
    pocket means in said sleeve member extending longitudinally thereof retaining said resilient member against lateral displacement from said sleeve member,
    and means anchoring one of said members to a seat frame member at the rear edge of said seat,
    said resilient member restoring said sleeve and thereby said belt section to its original extensible position across said seat upon release from seat occupant restraining position.

2. A seat belt positioning device according to claim 1 in which the resilient member has an end portion extending from said sleeve,
    said projecting end portion of said resilient member being anchored to the seat frame member.

3. In a vehicle body having a seat mounted therein,
    a seat belt assembly comprising a short belt anchored at one of its ends to the vehicle body outboard of said seat and a longer belt anchored at one of its ends to the vehicle body inboard of said short belt, and buckle means on the other ends of said belts for connecting one to the other;
    a seat belt positioning device comprising an elongated flexible sleeve member encompassing said longer belt between the buckle thereon and the rear edge of said seat,
    said sleeve member having a longitudinally extending pocket therein,
    a resilient member extending longitudinally of said sleeve member,
    said resilient member being retained by said pocket in said sleeve member for movement longitudinally thereof but being nonlaterally displaceable relative thereto,
    said resilient member having a projecting end portion extending from said sleeve,
    and means anchoring said projecting end portion to a seat frame member at the rear edge of said seat,
    said resilient member being effective to maintain said longer belt on said seat in substantially normal relationship to the rear edge thereof when not buckled to said short belt.

4. In a vehicle body according to claim 3,
    the means anchoring said resilient member to said seat frame comprising a bracket through which said longer belt passes and to the exterior surface of which said resilient means is secured.

References Cited by the Examiner
UNITED STATES PATENTS

| | | | |
|---|---|---|---|
| 2,480,915 | 9/1949 | George | 297—388 |
| 2,820,452 | 1/1958 | Gregg | 297—385 |
| 3,147,996 | 9/1964 | Ferrara et al. | 297—388 |
| 3,163,467 | 12/1964 | Deneau | 297—388 |
| 3,199,917 | 8/1965 | Veley et al. | 297—385 |

References Cited by the Applicant
UNITED STATES PATENTS

| | | |
|---|---|---|
| 1,830,059 | 11/1931 | Hoffman. |
| 2,480,915 | 9/1949 | George. |
| 2,510,115 | 6/1950 | Jakosky. |

FRANK B. SHERRY, *Primary Examiner.*

R. B. FARLEY, *Assistant Examiner.*